No. 649,354. Patented May 8, 1900.
A. REUBOLD.
MEAT COOKING DEVICE.
(Application filed Feb. 7, 1900.)
(No Model.)
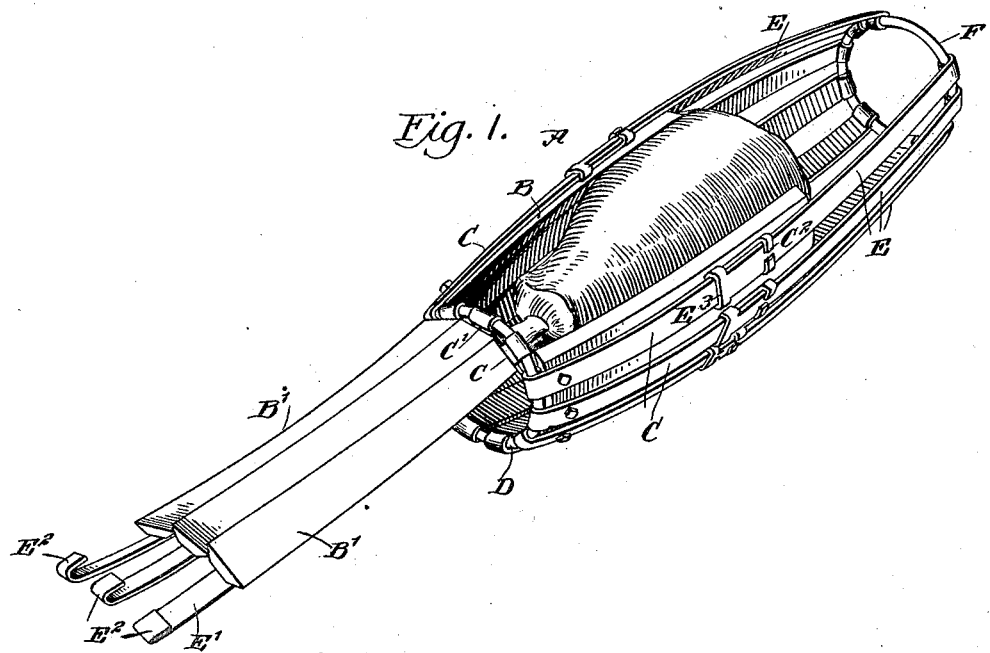
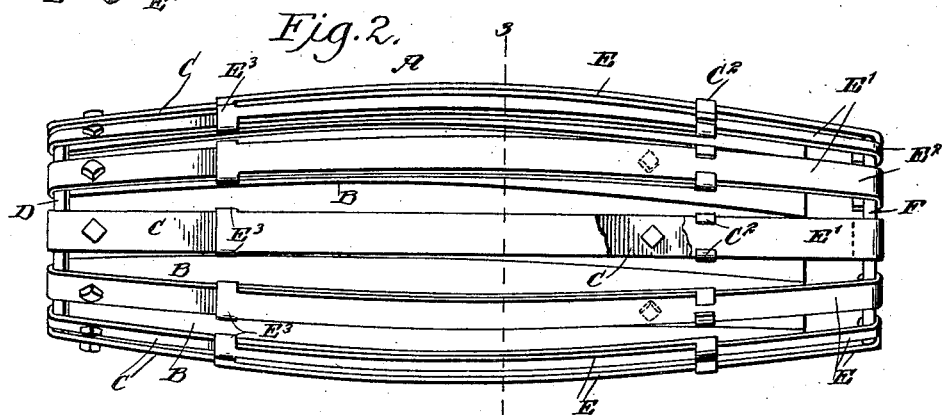
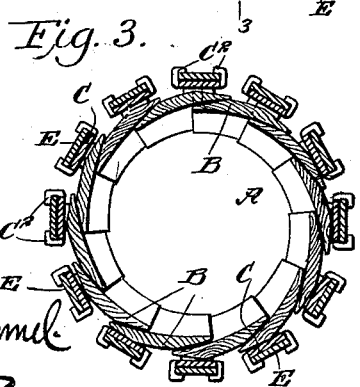
WITNESSES:
INVENTOR
BY
ATTORNEYS

UNITED STATES PATENT OFFICE.

ADAM REUBOLD, OF NEW YORK, N. Y.

MEAT-COOKING DEVICE.

SPECIFICATION forming part of Letters Patent No. 649,354, dated May 8, 1900.

Application filed February 7, 1900. Serial No. 4,359. (No model.)

*To all whom it may concern:*

Be it known that I, ADAM REUBOLD, a citizen of the United States, and a resident of the city of New York, borough of Manhattan, in the county and State of New York, have invented a new and Improved Meat-Cooking Device, of which the following is a full, clear, and exact description.

The object of the invention is to provide a new and improved meat-cooking device more especially designed for cooking hams and the like and arranged to permit of conveniently inserting or removing the ham and of holding the latter in proper position and inclosed in wood while the cooking takes place, so that the meat is not injured by coming in contact with metal parts and at the same time retaining the valuable properties contained in the meat during the process of cooking.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement in an open position. Fig. 2 is a side elevation of the same in a closed position, and Fig. 3 is a transverse section of the same on the line 3 3 in Fig. 2.

The improved meat-cooking device consists, essentially, of a barrel-shaped body A, open at the ends and formed of wooden staves B, having their side edges beveled to overlap each other, as is plainly indicated in Fig. 3. The staves B are secured at their outer faces to bars C, preferably made of metal and formed at their outer ends with eyes C', engaging a ring D, so as to permit the bars and their staves to swing inward and outward on the ring D as a fulcrum. On the bars C are mounted to slide lengthwise slide-bars E, formed at their outer ends with eyes engaging a ring F, similar to the ring D, the said rings D and F forming the open ends of the device, as will be readily understood by reference to Fig. 1.

A number of staves B' and the slide-bars E' thereof are formed at their outer ends with hooks $E^2$ instead of eyes to hook upon the ring F when it is desired to close the device, as hereinafter more fully described, said staves B' forming a side door for inserting or removing a ham or other piece of meat to be treated, it being understood that for this purpose the slide-bars E' are moved outward a sufficient distance to disengage their hooks $E^2$ from the ring F to allow of swinging the staves B' into the open position shown in Fig. 1 by their bars C turning on the ring D as the pivot.

The bars E E' and the ring F form an opening and closing device for the staves B—that is, when the ring F and the said bars E E' are moved lengthwise in a direction from the ring D then the staves B, with their bars C, swing outward to allow of conveniently inserting a ham into the body A, the door-staves B' then being in an open position, as indicated in Fig. 1. After the ham is inserted the door-staves B' are swung into a closed position, the hooks $E^2$ engaging the ring F, and then pressure is exerted on said ring F in a lengthwise direction of the device, so as to cause the bars E to slide inward on the bars C, whereby the staves B, with their bars C, are caused to swing inward to press the ham and to securely hold the same in position by the staves, it being understood that as the staves overlap they are free to slide over each other slightly in a transverse direction during the closing operation, so that the ham is completely inclosed at its sides in wood. It is understood that as the staves B and bars C and E bulge outward at their middle the outward-and-inward movement of the bars E on the bars C causes an opening-and-closing movement of said staves for the purpose mentioned.

In order to mount the bars E, E', and C slidably one on the other, the inner end of each bar E E' is provided with a guideway $E^3$, engaging the side edges and part of the under side of a corresponding bar C, and each of the bars C is provided at its inner end with a similar guideway $C^2$, engaging the side edges and the front face of the corresponding bar E or E'.

From the foregoing it is evident that a ham can be readily placed in position in the barrel-shaped body A and secured therein by the closing wooden staves, as described, the device then being ready to be placed in a suitable boiler for subjecting the ham to the cooking process while contained in the wooden parts of the device. Thus the meat itself does not come in contact with any metal parts during the cooking operation, and hence the meat is not likely to be injured by such contact, as is so frequently the case in devices of this class heretofore constructed.

When the ham is properly cooked, the device is removed from the boiler, and then the ring F is pulled outward to cause the staves to open up, after which the door-staves B' are swung into an open position, as described, to permit of conveniently removing the cooked ham or other meat from the barrel-shaped body A.

Having thus fully described my invention, I claim as new and desire to secure by Letters Patent—

1. A meat-cooking device, comprising a barrel-shaped body having open ends, and arranged to contain the article to be cooked, and a closing device for said body, for pressing and inclosing the article at the sides thereof, substantially as shown and described.

2. A meat-cooking device, comprising a barrel-shaped body for containing the article to be cooked, and formed essentially of movable staves, and a closing device for the said staves, to move the latter inward and press and hold the inclosed article, as set forth.

3. A meat-cooking device, comprising a barrel-shaped body having open ends, and arranged for containing the article to be cooked, the body being formed of staves, some of which form a side door for the insertion and removal of the article under treatment, substantially as shown and described.

4. A meat-cooking device, comprising a barrel-shaped body having open ends, and arranged for containing the article to be cooked, the body being formed of staves, some of which form a side door for the insertion and removal of the article under treatment, and a closing device for said staves, to move the staves inward and press and hold the inclosed article, as set forth.

5. A meat-cooking device, comprising a body open at the ends and formed of staves overlapping each other at their sides, and a closing device slidable on the outside of the staves, to move the latter closer together to press and hold the inclosed article, said closing device consisting of bars fitted to slide lengthwise on the staves at the outside thereof, and a ring to which the outer ends of the bars are attached, substantially as shown and described.

6. A meat-cooking device, comprising a body formed of overlapping staves, guide-bars secured to the staves lengthwise thereof, a connecting-piece for the outer ends of the guide-bars, a frame slidable on the body for opening or closing the staves, the frame having slide-bars mounted to slide in said guide-bars, and a connecting-piece for the outer ends of the said slide-bars, substantially as shown and described.

7. A meat-cooking device, comprising a body formed of overlapping staves, guide-bars secured to the staves lengthwise thereof, a connecting-piece for the outer ends of the guide-bars, a frame slidable on the body for opening or closing the staves, the frame having slide-bars mounted to slide in said guide-bars, and a connecting-piece for the outer ends of the said slide-bars, some of the slide-bars having a removable connection with their connecting-piece, and the corresponding staves having a hinge or pivot connection with their connecting-pieces, to allow of swinging such staves into open position, substantially as shown and described.

8. A meat-cooking device having a body, comprising overlapping staves, some of which form a door adapted to be opened or closed for obtaining access to the body, for inserting or removing the article under treatment, substantially as shown and described.

In testimony whereof I have signed my name to this specification in the presence of two subscribing witnesses.

ADAM REUBOLD.

Witnesses:
THEO. G. HOSTER,
EVERARD BOLTON MARSHALL.